United States Patent
Suzuki

(10) Patent No.: US 11,396,628 B2
(45) Date of Patent: Jul. 26, 2022

(54) NEAR-INFRARED LIGHT EMITTING FLUORESCENT MATERIAL

(71) Applicant: NICHIA CORPORATION, Anan (JP)

(72) Inventor: Tomokazu Suzuki, Tokushima (JP)

(73) Assignee: NICHIA CORPORATION, Anan (JP)

(*) Notice: Subject to any disclaimer, the term of this patent is extended or adjusted under 35 U.S.C. 154(b) by 192 days.

(21) Appl. No.: 16/564,486

(22) Filed: Sep. 9, 2019

(65) Prior Publication Data

US 2020/0079995 A1 Mar. 12, 2020

(30) Foreign Application Priority Data

Sep. 10, 2018 (JP) .............................. JP2018-168451
Aug. 8, 2019 (JP) .............................. JP2019-145965

(51) Int. Cl.
  C09K 11/77 (2006.01)
  C09K 11/68 (2006.01)
  C01G 37/14 (2006.01)

(52) U.S. Cl.
  CPC .......... C09K 11/7706 (2013.01); C01G 37/14 (2013.01); *C01P 2002/54* (2013.01); *C01P 2006/60* (2013.01)

(58) Field of Classification Search
  CPC .......................... C09K 11/7706; C09K 11/685
  See application file for complete search history.

(56) References Cited

U.S. PATENT DOCUMENTS

| 5,202,777 A | * | 4/1993 | Sluzky ............... C09K 11/7701 252/301.4 R |
| 8,695,430 B1 | * | 4/2014 | Eldridge ................ G01K 11/20 73/705 |
| 9,504,207 B2 | | 11/2016 | Onuma et al. |
| 2015/0357532 A1 | | 12/2015 | Onuma et al. |

FOREIGN PATENT DOCUMENTS

| JP | H07286171 A | | 10/1995 |
| JP | 2001352101 A | | 12/2001 |
| JP | 2012149223 | * | 8/2012 |
| WO | 2014103671 A1 | | 7/2014 |

* cited by examiner

*Primary Examiner* — Matthew E. Hoban
(74) *Attorney, Agent, or Firm* — Hunton Andrews Kurth LLP

(57) ABSTRACT

Provided is a near-infrared light emitting fluorescent material including an oxide containing Gd, Cr and Al, in which a molar ratio of Cr is in a range of 0.0085 or more and 0.05 or less when a total molar ratio of Gd and Cr is defined as 1 in 1 mol of the chemical composition of the near-infrared light emitting fluorescent material, and having a light emission peak wavelength in a range of 690 nm or more and 790 nm or less, as excited with light having a light emission peak wavelength in a range of 380 nm or more and 480 nm or less.

2 Claims, 4 Drawing Sheets

NEAR-INFRARED LIGHT EMITTING FLUORESCENT MATERIAL

CROSS-REFERENCE TO RELATED PATENT APPLICATION

This application claims priority to Japanese Patent Application No. 2018-168451, filed on Sep. 10, 2018, and Japanese Patent Application No. 2019-145965, filed on Aug. 8, 2019, the entire disclosures of which are incorporated herein by references in their entirety.

BACKGROUND

Technical Field

The present disclosure relates to a near-infrared light emitting fluorescent material. In this specification, the "fluorescent material" is used in the same meaning as a "fluorescent phosphor".

Description of Related Art

As a fluorescent material that emits light in a wavelength range of red to near-infrared (hereinafter also referred to as "near-infrared light emitting fluorescent material"), a composition such as $Y_3Al_5O_{12}$:Cr, $Al_2O_3$:Cr, $LiAlO_2$:Fe, CdS:Ag, or $GdAlO_3$:Cr is known (see, for example, Japanese Unexamined Patent Publication No. 2001-352101).

Such a near-infrared light emitting fluorescent material has been considered to be utilized as, for example, light sources for plant growth and cultivation in combination with a light emitting diode that emits blue light as an excitation light source for the near-infrared light emitting fluorescent material (see, for example, International Unexamined Patent Publication No. 2014/103671).

However, there has been a demand to further improve the light emission intensity of the near-infrared light emitting fluorescent material. Accordingly, the present disclosure has an object to further improve the light emission intensity of the near-infrared light emitting fluorescent material.

SUMMARY

An embodiment of the present disclosure is a near-infrared light emitting fluorescent material including an oxide containing Gd, Cr and Al, in which a molar ratio of Cr is in a range of 0.0085 or more and 0.05 or less when a total molar ratio of Gd and Cr is defined as 1 in 1 mol of the chemical composition of the near-infrared light emitting fluorescent material, and having a light emission peak wavelength in a range of 690 nm or more and 790 nm or less, as excited with light having a light emission peak wavelength in a range of 380 nm or more and 480 nm or less.

In accordance with the near-infrared light emitting fluorescent material according to an embodiment of the present disclosure, the light emission intensity can be improved.

DETAILED DESCRIPTION

Figure 1:
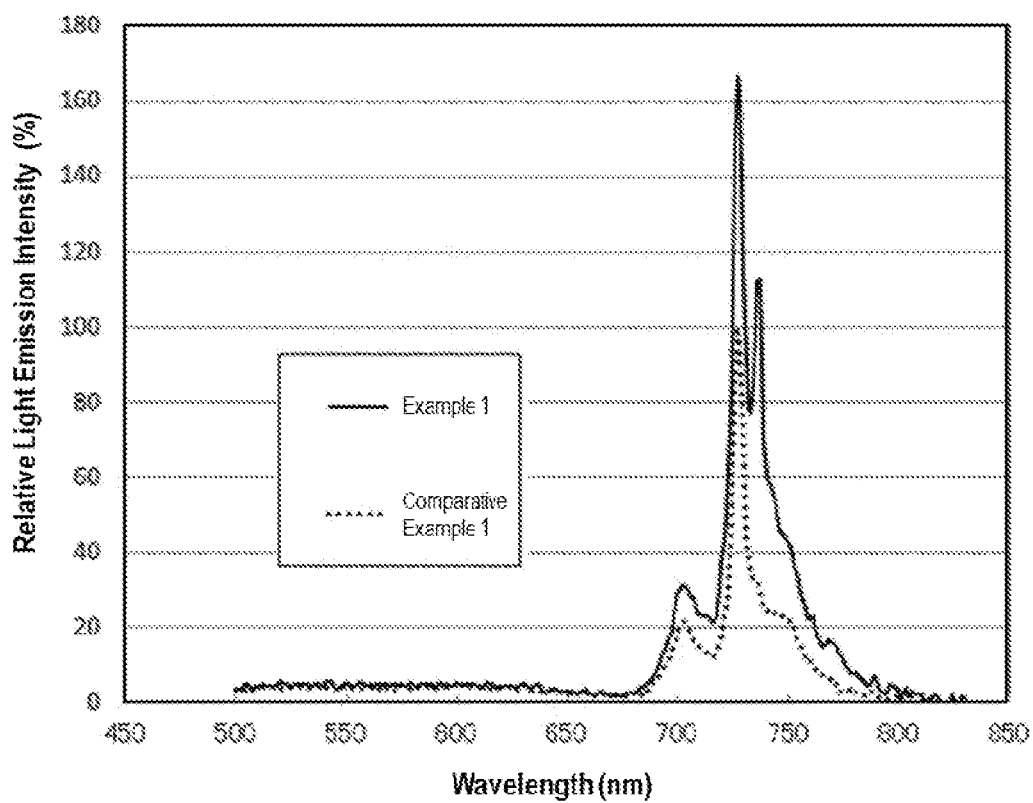
FIG. 1 is a graph showing a light emission spectrum of the near-infrared light emitting fluorescent material according to Example 1 and a light emission spectrum of the fluorescent material according to Comparative Example 1.

The near-infrared light emitting fluorescent material according to the present disclosure will be described on the basis of embodiments. The embodiments shown below are exemplifications for embodying the technical idea of the present disclosure, and the present disclosure is not limited to the near-infrared light emitting fluorescent material mentioned below. The relationships between the color names and the chromaticity coordinates, and the relationships between the wavelength range of light and the color names of monochromic light are in accordance with Japanese Industrial Standard (JIS) Z8110.

The near-infrared light emitting fluorescent material may be a fluorescent material having a composition containing Cr, Gd, Al, and oxygen. The near-infrared light emitting fluorescent material may include an oxide containing Gd, Cr and Al. The near-infrared light emitting fluorescent material preferably comprises an oxide containing Gd, Cr and Al. The near-infrared light emitting fluorescent material emits light having a light emission peak wavelength in a range of 690 nm or more and 790 nm or less, as excited with light having a light emission peak wavelength in a range of 380 nm or more and 480 nm or less.

The near-infrared light emitting fluorescent material has a Perovskite structure, and preferably comprises or consists of an oxide containing Gd, Cr and Al, in which a molar ratio of Cr is in a range of 0.0085 or more and 0.05 or less when a total molar ratio of Gd and Cr is defined as 1 in 1 mol of the chemical composition of the near-infrared light emitting fluorescent material. The near-infrared light emitting fluorescent material preferably has a composition represented by the following formula (I).

$$(Gd_{1-x}Cr_x)AlO_3 \qquad (I)$$

wherein x satisfies $0.0085 \leq x \leq 0.05$. When the parameter x representing the molar ratio of Cr is less than 0.0085 in 1 mol of the chemical composition represented by formula (I), the light emission intensity tends to decrease, and when the parameter x is more than 0.05, the light emission intensity tends to decrease due to concentration quenching. In the present specification, the "molar ratio" expresses the molar amount of each element in 1 mol of the chemical composition of the fluorescent material.

In the near-infrared light emitting fluorescent material having a composition represented by the formula (I), the parameter x representing the molar ratio of Cr is preferably in a range of 0.010 or more and 0.040 or less ($0.010 \leq x \leq 0.040$), more preferably in a range of 0.012 or more and 0.030 or less ($0.012 \leq x \leq 0.030$). When the parameter x representing the molar ratio of Cr falls within the above range in the near-infrared light emitting fluorescent material having a composition represented by the formula (I), the light emission intensity of the near-infrared light emitting fluorescent material may be further improved.

The near-infrared light emitting fluorescent material is preferably excited with light having a light emission peak wavelength in a range of 390 nm or more and 470 nm or less, more preferably excited with light having a light emission peak wavelength in a range of 395 nm or more and 460 nm or less. This is because, when the excitation light to the near-infrared light emitting fluorescent material has a light emission peak wavelength in the above range, the light emission intensity of the near-infrared light emitting fluorescent material may be further improved.

Specific examples of the composition of the near-infrared light emitting fluorescent material may include $(Gd_{0.985}Cr_{0.015})AlO_3$, $(Gd_{0.98}Cr_{0.02})Al_3$, $(Gd_{0.97}Cr_{0.03})AlO_3$, $(Gd_{0.96}Cr_{0.04})AlO_3$, and $(Gd_{0.991}Cr_{0.009})AlO_3$.

A method for producing the near-infrared light emitting fluorescent material will be hereunder described.

The near-infrared light emitting fluorescent material may be produced by, for example, the following method. The method for producing the near-infrared light emitting fluorescent material preferably includes preparing raw materials, mixing the raw materials, and calcining the mixture obtained by mixing the raw materials. The method for producing the near-infrared light emitting fluorescent material may include a post-treatment for grinding and washing the calcined product obtained by calcining.

First, oxides containing the constituent elements of the composition represented by the formula (I) or compounds to be readily oxidized at a high temperature are prepared as raw materials, and these are weighed while considering the stoichiometric ratio. Alternatively, compounds the constituent elements of the composition represented by the formula (I) are weighed while considering the stoichiometric ratio, dissolved in an acid solution and the acid solution is coprecipitated with other acid, for example, oxalic acid to obtained a coprecipitated product. The coprecipitated product is calcined to obtain a coprecipitated oxide. The coprecipitated oxide may be used as a raw material. Oxides containing the constituent elements of the composition represented by the formula (I) or a compound which becomes an oxide easily at high temperature may be used as a raw material together with the coprecipitated oxide. Examples of the oxides or the coprecipitated oxide serving as the raw materials other than a co-precipitated oxide may include, for examples, $Gd_2O_3CrO$, $Cr_2O_3$, $CrO_3$, and $Al_2O_3$. Examples of the compounds to be readily oxidized at a high temperature may include hydroxides, oxalates, carbonates, chlorides, nitrates, and sulfates, each containing the constituent elements of the composition represented by the formula (I); and specific examples thereof may include $Al(OH)_3$. In addition to the above, gadolinium metal, chromium metal, and aluminum metal may be used.

In addition, it is preferable to suitably add an additive material, such as a flux, to the raw materials. Preferred examples of the flux may include fluorides, such as ammonium fluoride and barium fluoride. By containing the flux, the solid phase reaction may be promoted to form particles having uniform size.

As the mixing machine to be used in the mixing step, a vibration mill, a roll mill, and a jet mill, in addition to a ball mill which is generally industrially used, may be used. Further, the mixture may be optionally ground using a grinding machine so as to enlarge the specific surface area. In order to adjust the specific surface area of the powder in a certain range, the mixture may be optionally classified using a wet separator, such as a sedimentation tank, a hydrocyclone, and a centrifugal separator, or a dry classifier, such as a cyclone and an air separator, which are generally industrially used.

The mixture obtained by mixing the raw materials is filled in a crucible made of SiC, quartz, alumina, BN, and calcined under an inert atmosphere containing argon, nitrogen; a reducing atmosphere containing hydrogen; or an oxidation atmosphere in the air. The calcination is performed at a predetermined temperature and time. For example, the calcination is performed at a temperature in a range 1,000° C. or more and 2,100° C. or less in the air for a time range of 2 hours or more and 15 hours or less, to thereby obtain a calcined product.

In the calcining step, the mixture containing the raw materials for the fluorescent material and the flux may be calcined in a two-step process comprising a first calcining step to be performed in the air or a weak-reducing atmosphere and a second calcining step to be performed in a reducing atmosphere. Here, the weak-reducing atmosphere means an atmosphere having weak reducibility, which is prepared to contain at least a necessary amount of oxygen in the reaction process of forming a desired fluorescent material from the raw materials. For example, the weak-reducing atmosphere refers to an atmosphere containing oxygen in a range of 1% by volume or more and 20% by volume or less, hydrogen in a range of 0.1% by volume or more and 4% by volume or less, and nitrogen or argon in a range of 79% by volume or more and 98.9% by volume or less. The amount of oxygen in the weak-reducing atmosphere may be in a range of 2% by volume or more and 15% by volume or less, or may be in a range of 3% by volume or more and 12% by volume or less. By performing the first calcining step in the air or in the weak-reducing atmosphere until the structure formation of the desired fluorescent material is completed, black discoloration of the fluorescent material may be prevented, and lowering of the optical absorption efficiency may be thus prevented. Also, the reducing atmosphere in the second calcining step means an atmosphere having reducibility higher than that of the weak-reducing atmosphere. For example, the reducing atmosphere in the second calcining step refers to an atmosphere containing more than 4% by volume hydrogen. By calcining in the two-step process as described above, a fluorescent material having high absorption efficiency of the excitation wavelength can be obtained.

The calcined product obtained by calcining the raw materials may be subjected to a post-treatment to obtain a near-infrared light emitting fluorescent material. Examples of the post-treatment to be performed after the calcination may include grinding the calcined product, washing, solid-liquid separation, drying, and classification. The grinding may be performed using a wet-type or dry-type ball mill. The solid-liquid separation may be performed according to a generally industrial method, such as filtration, suction filtration, pressure filtration, centrifugation, or decantation. The drying may be performed using a generally industrial apparatus, such as a vacuum dryer, a hot air heating dryer, a conical dryer, or a rotary evaporator. The classification may be performed using a generally industrial apparatus, such as a wet-type or dry-type vibration sieve machine, or a sedimentation-type classifying machine.

Light Emitting Device

Figure 4:
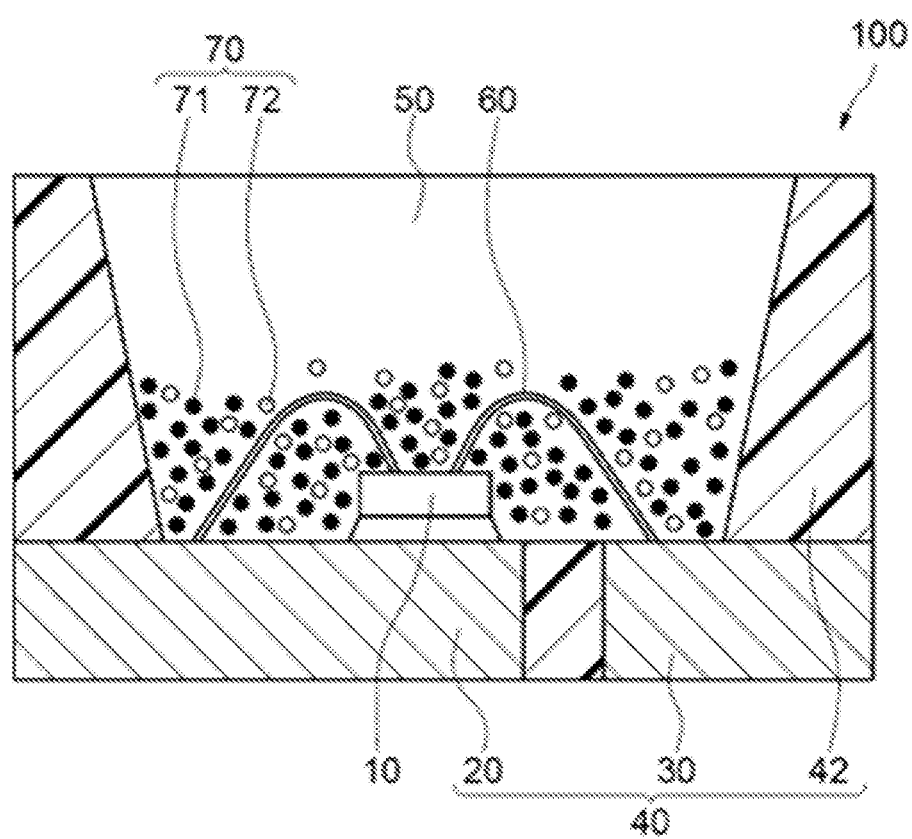
FIG. 4 is a schematic cross-sectional view showing a light emitting device of the present disclosure.

The obtained near-infrared light emitting fluorescent material may be used for a light emitting device. FIG. 4 is a schematic cross-sectional view showing an example of the light emitting device. The light emitting device 100 is provided with a support of, for example, a molded body 40, a light emitting element 10, and a fluorescent member 50. The molded body 40 is composed of a first lead 20 and a second lead 30, which are integrally molded with a resin part 42 containing a thermoplastic resin or a thermosetting resin. The molded body 40 forms a depression having a bottom surface and a side surface, and the light emitting element 10 is arranged on the bottom surface of the depression. The light emitting element 10 has a pair of positive and negative electrodes, and the pair of positive and negative electrodes are electrically connected to the first lead 20 and the second lead 30, respectively, each via a wire 60. The light emitting element 10 is covered with the fluorescent member 50. The fluorescent member 50 includes, for example, a fluorescent material 70 that undergoes wavelength conversion of light emitted from the light emitting element 10, and a resin. The fluorescent material 70 may include a first fluorescent material 71 and a second fluorescent material 72. The first lead 20 and the second lead 30 each connected to the pair of positive and negative electrodes of the light emitting element 10 are partly exposed toward outside a package constituting the light emitting device 100. Via the first lead 20 and the second lead 30, the light emitting device 100 receives an external power to emit light.

The light emitting device 100 may include the light emitting element 10 having a light emission peak wavelength in a wavelength range of 380 nm or more and 480 nm or less, and a first fluorescent material 71 that is excited with light emitted from the light emitting element 10 to emit light having a light emission peak wavelength in a range of 690 nm or more and 790 nm or less. The light emitting device 100 may include a second fluorescent material 72 that is excited with light emitted from the light emitting element 10 to emit light having a light emission peak wavelength in a wavelength range different from that of the first fluorescent material 71. The near-infrared light emitting fluorescent material may be used as the first fluorescent material 71. As the light emitting element, a light emitting element containing a nitride semiconductor ($In_XAl_YGa_{1-X-Y}N$, 0≤X, 0≤Y, X+Y≤1) may be used.

EXAMPLES

The present disclosure will be described more specifically with reference to Examples below. The present disclosure is not limited to these Examples.

Example 1

First, as the raw materials for the near-infrared light emitting fluorescent material, the compounds described below were respectively weighed so as to have the following masses. Barium fluoride ($BaF_2$) was used as a flux.

$Gd_2O_3$ • • • 77.40 g
$Cr_2O_3$ • • • 0.49 g
$Al_2O_3$ • • • 22.11 g
$BaF_2$ • • • 5.00 g

Next, the weighed raw materials and the flux were mixed and put into a container, and then dry mixed for 1 hour using a ball mill to obtain a mixture. The resulting mixture was filled in an alumina crucible and calcined at a temperature of 1,500° C. for 10 hours. The atmosphere in calcining was set to a reducing atmosphere ($H_2$: 3% by volume, $N_2$: 97% by volume). The resulting calcined product was filtered with a dry-type sieve to obtain a near-infrared light emitting fluorescent material according to Example 1.

Example 2

A near-infrared light emitting fluorescent material according to Example 2 was obtained in the same manner as in Example 1 except that the compounds described below were respectively weighed so as to have the following masses as the raw materials.

$Gd_2O_3$ • • • 77.36 g
$Cr_2O_3$ • • • 0.66 g
$Al_2O_3$ • • • 21.99 g
$BaF_2$ • • • 5.00 g

Example 3

A near-infrared light emitting fluorescent material according to Example 3 was obtained in the same manner as in Example 1 except that the compounds described below were respectively weighed so as to have the following masses as the raw materials.

$Gd_2O_3$ • • • 76.74 g
$Cr_2O_3$ • • • 1.00 g
$Al_2O_3$ • • • 22.26 g
$BaF_2$ • • • 5.00 g

Example 4

A near-infrared light emitting fluorescent material according to Example 4 was obtained in the same manner as in Example 1 except that the compounds described below were respectively weighed so as to have the following masses as the raw materials.

$Gd_2O_3$ • • • 76.30 g
$Cr_2O_3$ • • • 1.33 g
$Al_2O_3$ • • • 22.36 g
$BaF_2$ • • • 5.00 g

Example 5

A near-infrared light emitting fluorescent material according to Example 5 was obtained in the same manner as in Example 1 except that the compounds described below were respectively weighed so as to have the following masses as the raw materials.

$Gd_2O_3$ • • • 77.66 g
$Cr_2O_3$ • • • 0.30 g
$Al_2O_3$ • • • 22.05 g
$BaF_2$ • • • 5.00 g

Comparative Example 1

A fluorescent material according to Comparative Example 1 was obtained in the same manner as in Example 1 except that the compounds described below were respectively weighed so as to have the following masses as the raw materials.

$Gd_2O_3$ • • • 77.78 g
$Cr_2O_3$ • • • 0.20 g
$Al_2O_3$ • • • 22.02 g
$BaF_2$ • • • 5.00 g

Comparative Example 2

A fluorescent material according to Comparative Example 2 was obtained in the same manner as in Example 1 except that the compounds described below were respectively weighed so as to have the following masses as the raw materials.

$Gd_2O_3$ • • • 75.41 g
$Cr_2O_3$ • • • 2.02 g
$Al_2O_3$ • • • 22.57 g
$BaF_2$ • • • 5.00 g

Composition Analysis

The fluorescent material according to each of Examples and Comparative Examples was subjected to composition analysis using an inductively coupled plasma atomic emission spectrometry (ICP-AES, type: Optima 4300DV, manufactured by PerkinElmer Inc.). The molar ratios of Gd and Cr were measured when the molar ratio of Al contained in 1 mol of the chemical composition of the fluorescent material was set as a reference (1 mol). The results are shown in Table 1. Here, the composition analysis results of oxygen and the other elements are omitted since the measurement errors are large.

Light Emission Characteristics of Fluorescent Material

As for the fluorescent material obtained in each of Examples 1 to 5 and Comparative Examples 1 to 2, using a quantum efficiency measuring apparatus (type: QE-2000, manufactured by Otsuka Electronics Co., Ltd.), the light emission spectrum in a wavelength range of 500 nm or more and 830 nm or less was measured when the excitation wavelength was set to 450 nm. From the measured light emission spectrum, the relative light emission intensity (%) of each fluorescent material was determined. As the relative light emission intensity, the relative value of the light emission spectrum area in a range of 500 nm or more and 830 nm or less in each of Examples and Comparative Examples was determined when the light emission spectrum area in a range of 500 nm or more and 830 nm or less in Comparative Example 1 was set as a reference (100%). In the emission spectrum of the fluorescent material, the light emission spectrum area in a range of 500 nm or more and 830 nm or less is an area between the horizontal axis and the emission spectrum in a range of 500 nm or more and 830 nm or less.

TABLE 1

| | Composition (Molar Ratio) | | | Relative Light Emission |
|---|---|---|---|---|
| | Gd $1-x$ | Cr $x$ | Al — | Intensity (%) |
| Example 1 | 0.985 | 0.015 | 1 | 179 |
| Example 2 | 0.980 | 0.020 | 1 | 172 |
| Example 3 | 0.970 | 0.030 | 1 | 143 |
| Example 4 | 0.960 | 0.040 | 1 | 124 |
| Example 5 | 0.991 | 0.009 | 1 | 108 |
| Comparative Example 1 | 0.994 | 0.006 | 1 | 100 |
| Comparative Example 2 | 0.940 | 0.060 | 1 | 92 |

As shown in Table 1, in the fluorescent material according to each of Examples 1 to 5, the parameter x representing the molar ratio of Cr satisfied $0.0085 \leq x \leq 0.05$ in the composition, which was represented by the formula (I): $(Gd_{1-x}Cr_x)AlO_3$, of the near-infrared light emitting fluorescent material. The near-infrared relative light emission intensity in a range of 500 nm or more and 830 nm or less of the near-infrared light emitting fluorescent material according to each of Examples 1 to 5 was higher than that of the fluorescent material according to each of Comparative Examples 1 and 2. One of the reasons where the light emission intensity of the near-infrared light emitting fluorescent material according to each of Examples 1 to 5 was increased could be considered as follows. By containing Cr in a molar ratio in the range of 0.0085 or more and 0.05 or less in the chemical composition represented by the formula (I), Cr serving as an activating element was efficiently excited with light having a light emission peak wavelength in a range of 380 nm or more and 480 nm or less, and the light emission intensity was thus increased.

FIG. 1 is a graph showing a light emission spectrum of the near-infrared light emitting fluorescent material according to Example 1 and a light emission spectrum of the fluorescent material according to Comparative Example 1. The light emission spectrum of the near-infrared light emitting fluorescent material according to Example 1 had a light emission peak wavelength at around 727 nm, which was in a range of 690 nm or more and 790 nm or less. The light emission peak wavelength refers to a wavelength at which the light emission intensity becomes maximum in the light emission spectrum. On the other hand, the light emission spectrum of the fluorescent material according to Comparative Example 1 had a light emission peak wavelength in the same wavelength range, but the light emission intensity of the light emission peak wavelength in Comparative Example 1 was lower than that in Example 1.

Figure 2:
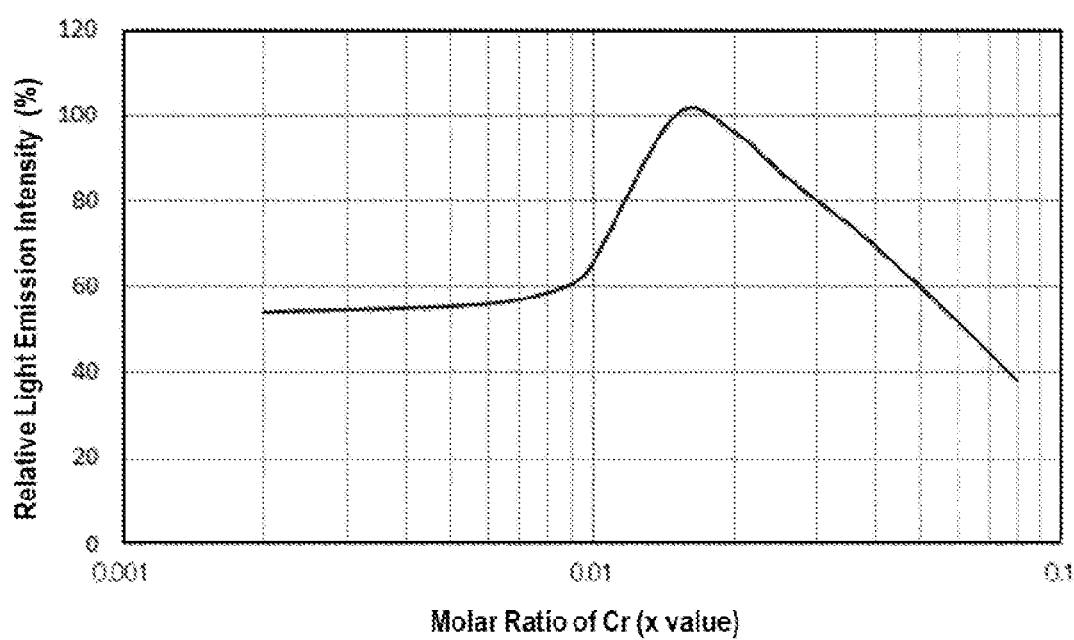
FIG. 2 is a graph showing a relationship between the molar ratio of Cr in 1 mol of each fluorescent material and the relative light emission intensity of each fluorescent material.

FIG. 2 is a graph showing a relationship between the molar ratio of Cr in 1 mol of the chemical composition and the relative light emission intensity of each fluorescent material. In the fluorescent material having a composition represented by the formula (I): $(Gd_{1-x}Cr_x)AlO_3$, the relative light emission intensity was increased by about 60% or more when the parameter x representing the molar ratio of Cr was in the ratio of 0.0085 or more and 0.05 or less ($0.0085 \leq x \leq 0.05$). In the fluorescent material having a composition represented by the formula (I), the relative light emission intensity was further increased to more than 60% when the parameter x representing the molar ratio of Cr was in the ratio of 0.010 or more and 0.040 or less ($0.010 \leq x \leq 0.040$). In the fluorescent material having a composition represented by the formula (I), the relative light emission intensity was further increased to about 70% or more when the parameter x representing the molar ratio of Cr was in the ratio of 0.012 or more and 0.030 or less ($0.012 \leq x \leq 0.030$).

Figure 3:
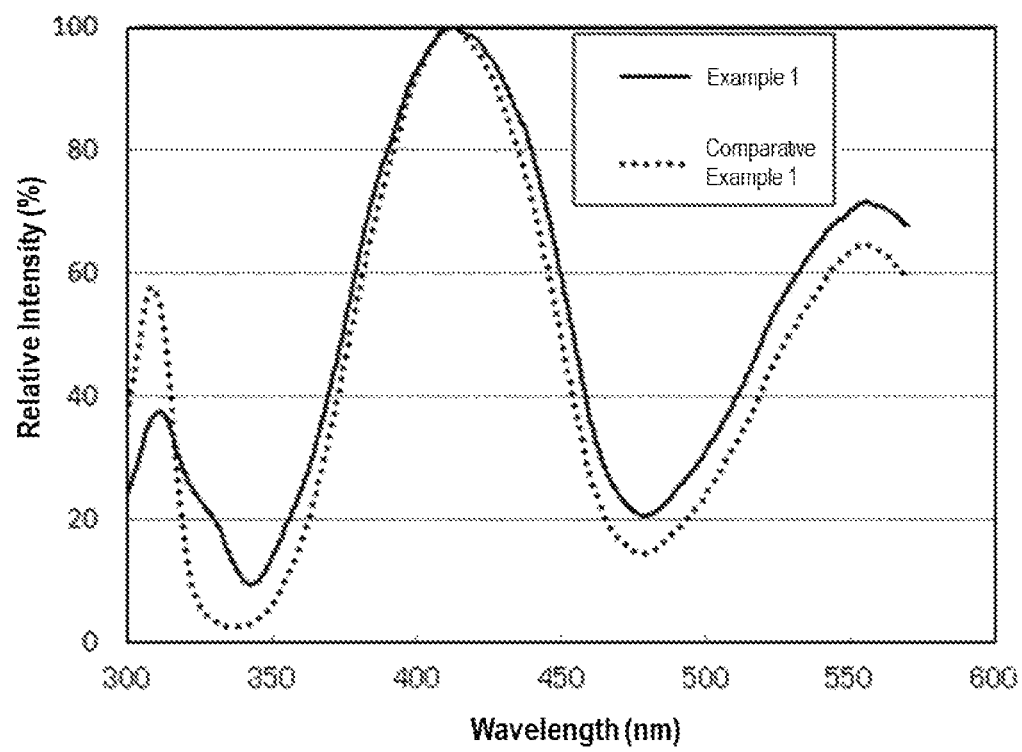
FIG. 3 is a graph showing an excitation spectrum of the near-infrared light emitting fluorescent material according to Example 1 and an excitation spectrum of the fluorescent material according to Comparative Example 1.

FIG. 3 is a graph showing an excitation spectrum of the near-infrared light emitting fluorescent material according to Example 1 and an excitation spectrum of the fluorescent material according to Comparative Example 1. It was found that the relative intensity of the excitation spectrum in a range of 395 nm or more and 460 nm or less of the near-infrared light emitting fluorescent material according to Example 1 was higher than that of the fluorescent material according to Comparative Example 1, and the near-infrared light emitting fluorescent material according to Example 1 was efficiently excited with light having a light emission peak wavelength in the above range.

In combination with an excitation light source such as a light emitting diode, the near-infrared light emitting fluorescent material according to the embodiment of the present disclosure may be utilized as a light emitting device. The light emitting device using the near-infrared light emitting fluorescent material according to the embodiment of the present disclosure may be utilized for applications requiring near-infrared light, such as lighting for plant growth.

The invention claimed is:

1. A near-infrared light emitting fluorescent material having a composition represented by the following formula (I);

$$(Gd_{1-x}Cr_x)AlO_3 \qquad (I)$$

wherein x satisfies $0.015 \leq x \leq 0.04$, and having a light emission peak wavelength in a range of 690 nm or more and 790 nm or less, as excited with light having a light emission peak wavelength in a range of 380 nm or more and 480 nm or less, wherein the near-infrared light emitting fluorescent are particles.

2. The near-infrared light emitting fluorescent material according to claim 1, having a light emission peak wavelength in a range of 690 nm or more and 790 nm or less, as excited with light having a light emission peak wavelength in a range of 395 nm or more and 460 nm or less.

\* \* \* \* \*